(No Model.)
H. L. HOPKINS.
HARVESTER CUTTER.
No. 273,083.  Patented Feb. 27, 1883.
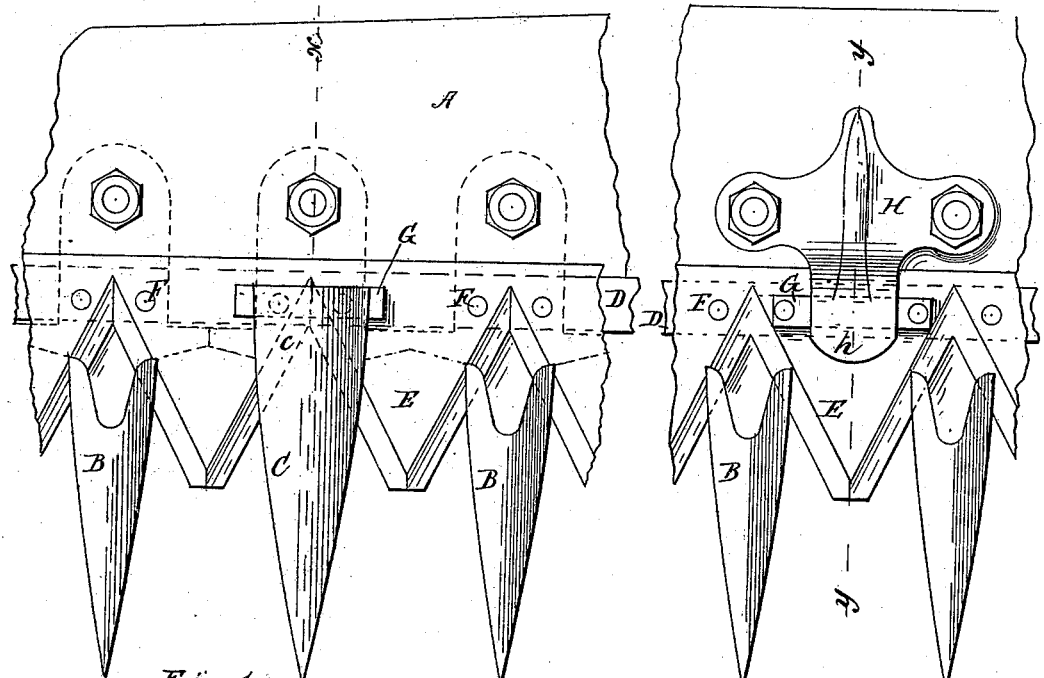
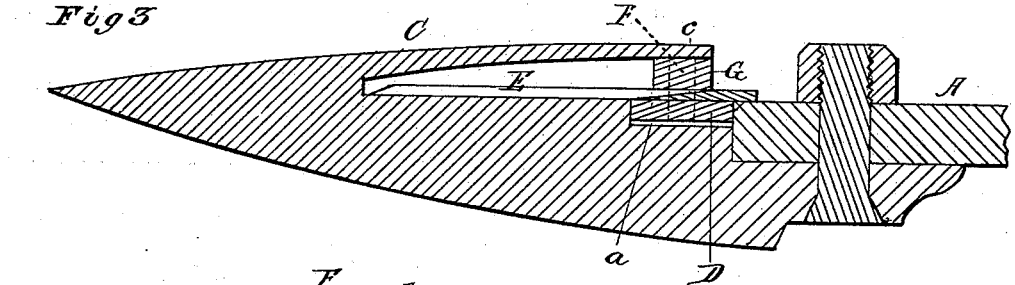
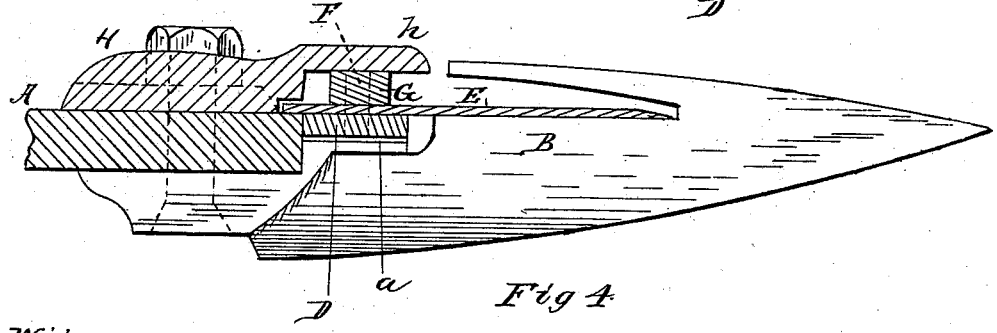
Witnesses
W. C. Coolies
A. M. Best.
Inventor
Harvey L. Hopkins
By Coburn & Thacher
Attorneys

UNITED STATES PATENT OFFICE.

HARVEY L. HOPKINS, OF CHICAGO, ILLINOIS.

HARVESTER-CUTTER.

SPECIFICATION forming part of Letters Patent No. 273,083, dated February 27, 1883.

Application filed October 30, 1882. (No model.)

*To all whom it may concern:*

Be it known that I, HARVEY L. HOPKINS, a citizen of the United States, residing at Chicago, in the county of Cook and State of Illinois, have invented certain new and useful Improvements in Harvester-Cutters, which are fully set forth in the following specification, reference being had to the accompanying drawings, in which—

Figure 1 represents a plan view of a section of a cutting apparatus for harvesters with my improvement applied; Fig. 2, a similar view of a like section, showing a modification of the same; Fig. 3, a transverse section taken on the line $x\ x$, Fig. 1, and on an enlarged scale; and Fig. 4, a similar section on a like scale, taken on the line $y\ y$, Fig. 2.

My invention relates to certain improvements in the means employed to hold the cutters down to their work, whereby the cutting apparatus is effectually cleared, and the difficulties experienced in the use of ordinary cutter-caps are entirely obviated.

In order to secure the proper operation of the knives in a harvester cutting apparatus, it is necessary that they should be held down closely to their work, so that as the cutter-bar is reciprocated the knives will move in close contact with the cutting-edges on the guard-fingers. It is well known that the ordinary cutter-cap employed for this purpose is objectionable. It is a small plate attached to the finger-bar in rear of the cutters, and projected forward over the latter and brought down close to their surface. With this device great difficulty is experienced by the accumulation of fine short grass, dirt, gum, or other foreign substances under the caps, whereby the friction is greatly increased, and frequently the cutters will bind, so that it is almost impossible to reciprocate the cutter-bar. It is well known that a slight increase of friction on the cutter-bar is very seriously felt at the driving mechanism, and no great force is required to pinch the cutter-bar sufficiently to overcome the friction of the machine and cause the wheels to slip. My present improvement is intended to obviate these difficulties, and to provide for keeping the cutters entirely free from all foreign substances, and at the same time hold them down in proper working position.

I will proceed to explain in detail the construction, application, and operation of the devices by which I accomplish these results in the present instance, and will then point out definitely in the claims the special improvements which I believe to be new and desire to protect by Letters Patent.

In the drawings, A represents a finger-bar of ordinary construction, and B the ordinary guard-fingers, which are attached in the usual way to the finger-bar. At suitable intervals a guard-finger, C, is modified somewhat in construction by extending the upper section, $c$, backward and over the cutters to a point about over the rivets which attach the knives to the cutter-bar, as shown in Figs. 1 and 3 of the drawings. These modified guard-fingers need be only few in number—say from three to five, about the same as the usual number of old-style cutter-caps. The cutter-bar D is of ordinary construction, and the cutters or knives E are usually triangular-shaped, and are attached to the cutter-bar by rivets F in the ordinary way.

Long narrow blocks G are attached to the cutter-bar and cutters wherever one of the guard-fingers C occurs. These blocks are attached to the cutters by extending the rivets of the latter so that the block is riveted to the cutter-bar by the same rivets that attach the cutters thereto. The blocks are just thick enough to fill the space between the knives and the rear end of the extended finger-cap $c$, and extend across the joint between two knives, and so are fastened by the rivets of two adjoining knives, as seen in Fig. 1 of the drawings. The length of the block is determined somewhat by the width of the guard-cap extension $c$. It is understood of course that the reciprocation of the cutters is in extent such that the center of each knife passes first to the center of its adjoining guard-finger on the one side, and then to the center of the finger on the other side. The relative length of the block G and width of the guard-cap extension $c$ should be such that at each reciprocation of the cutter-bar the block will be carried nearly out beyond the guard-cap extension first on one side and then on the other, but will not entirely escape from under the extension $c$ on either side. Obviously these blocks at suitable intervals, fitting reasonably close under the guard-cap extensions, will hold the cutters down properly to their work, and at the same time with every stroke of the cutters the space underneath the guard-cap extension will be left almost entirely free, and the reciprocation of the block back and forth underneath the extension will push the grass and other material which is brought under the finger-cap to one side, either freeing it at once from the finger or upon the reciprocation in the opposite direction. I thus provide a free, open space for all substances to pass back beyond the guard-fingers and push any material coming into this space either to one side or the other, so that it will fall backward away from the knives without obstruction. It will thus be seen that opportunity for a perfect clearance is afforded, and that there can be no gumming up of the knives under the guard-cap extension, which, in connection with the blocks, holds the cutters down to work. A cutting apparatus provided with this device I have found by actual experience will work freely in wet grass or anywhere else all day without any sensible increase in friction, so that the machine will run as easily at the end of the day as it does at the commencement of work in the morning.

As an additional precaution against the obstruction of the cutter-bar by clogging or gumming, I prefer to cut the recesses $a$ in the guard-fingers, within which the cutter-bar moves back and forth, somewhat deeper than the thickness of the cutter-bar, as shown in Figs. 3 and 4 of the drawings; and as the cutter-bar is supported by the knives resting in front upon the guard-fingers and at the rear upon the finger-bar, as shown in Figs. 3 and 4 of the drawings, it is obvious there will be a free space in the recesses $a$ underneath the cutter-bar. Any foreign substances coming into this space will generally be cleared out, and in any event will hardly accumulate sufficiently to fill up the openings and cause the cutter-bar to stick, as will sometimes happen under the ordinary construction where these recesses are made to receive the cutter-bar with a close fit. It is also obvious that the provision of this clear space in the guard-fingers below the cutter-bar will effectually prevent any undue friction between the guard-caps and the blocks, which there is a bare possibility might sometimes occur with the usual construction.

There may be some modifications in the construction and arrangement of this clearing device. The blocks may be arranged centrally on a single knife instead of crossing from one to the other, in which case the two adjacent guard-fingers should be provided with extension-caps and the blocks made of such length that they will slide nearly or quite from under the cap-extensions first of one guard-finger and then the other. The device may also be applied to the ordinary cutter-cap, as seen in Figs. 2 and 4 of the drawings, in which H represents a cutter-cap fastened to the finger-bar in rear of the cutters, and of ordinary construction, except that its front end, $h$, projecting over the cutters, is raised somewhat to provide for one of the blocks G, which in this instance is fastened to the knife that reciprocates underneath the cap, so that this block will slide back and forth under the projecting end of the cutter-cap, in substantially the same way as described in connection with the guard-finger caps. In this instance I prefer to provide a free space in the guard-finger underneath the cutter-bar, as shown in Fig. 4 of the drawings, which figure also shows the relative position of all the parts in this modification. This application of the clearing-blocks and the ordinary cutter-cap is a great improvement on the old style of plain caps, but at the same time it is not so satisfactory in its operation as in the construction first described, for it will be seen that there is no open space back of the sliding block through which grass, dirt, &c., may freely escape, and hence there is always more or less liability to choke in the space underneath the cutter-cap back of the block.

It is possible that in some instances it may be found desirable to make the cap-extension of the guard-fingers more or less elastic, though I prefer a stiff cap, and have found this construction to produce the most satisfactory results in the use I have already made of this device.

Other modifications in the construction and arrangement of the main parts of this mechanism will suggest themselves to those skilled in this class of machines, and therefore I do not wish to be understood as limiting myself to the particular construction and arrangement of devices shown and described in the drawings. The form of the blocks may be changed, and, in fact, may be in any shape and construction which will provide for projections from the cutters, arranged so as to move back and forth under the holding-caps to accomplish the results described above. The ends of the blocks may be slightly beveled or pointed, if desired.

Having thus described my invention, what I claim as new, and desire to secure by Letters Patent, is—

1. In a harvester cutting apparatus, a block or projection attached to the cutters, so as to reciprocate therewith, in combination with a cap or holder projecting over the front of the cutters and partly over said block, in light contact therewith, and arranged with reference thereto, to permit the block or projection to nearly leave the holder in its movement in each direction, substantially as and for the purposes set forth.

2. In a harvester cutting apparatus, a guard finger or fingers, C, having the cap extended back partly over the cutters, in combination with the cutters E and block G, attached to the cutter-bar and arranged to reciprocate underneath the guard cap or caps and to nearly or quite leave the same with its movement in each direction, substantially as and for the purposes set forth.

3. In a harvester cutting apparatus, a guard-finger, C, having its cap extended back partly over the cutters, and provided with recesses *a*, somewhat deeper than the thickness of the cutter-bar, in combination with the finger-bar A, the cutter-bar D, the knives E, and the blocks G, all arranged and operating substantially as and for the purposes set forth.

4. In a harvester cutting apparatus, an open slotted guard-finger, in combination with a reciprocating scalloped cutter, and a block or projection connected to the cutters and arranged to move underneath a guard cap or caps and in light contact therewith, substantially as and for the purposes set forth.

HARVEY L. HOPKINS.

Witnesses:
 EDWARD A. HALSEY,
 A. M. BEST.